United States Patent
Bjørkgård

(10) Patent No.: US 6,695,745 B1
(45) Date of Patent: Feb. 24, 2004

(54) GEAR SHIFT DEVICE

(75) Inventor: Sven Bjørkgård, Kongsberg (NO)

(73) Assignee: Kongsberg Automotive ASA, Kongsberg (NO)

( * ) Notice: Subject to any disclaimer, the term of this patent is extended or adjusted under 35 U.S.C. 154(b) by 0 days.

(21) Appl. No.: 10/129,390

(22) PCT Filed: Oct. 31, 2000

(86) PCT No.: PCT/NO00/00360
§ 371 (c)(1),
(2), (4) Date: May 3, 2002

(87) PCT Pub. No.: WO01/33112
PCT Pub. Date: May 10, 2001

(30) Foreign Application Priority Data

Nov. 4, 1999 (NO) ............................................ 19995409

(51) Int. Cl.[7] .................... B60K 41/04; B60K 20/00; G05G 9/00
(52) U.S. Cl. .................... 477/107; 477/110; 74/335; 74/473.1
(58) Field of Search ............... 477/107, 110; 74/335, 336 R, 471 R, 473.1, 473.11, 473.12, 473.13, FOR 100; 60/555, 571

(56) References Cited

U.S. PATENT DOCUMENTS

| | | | | |
|---|---|---|---|---|
| 2,974,766 A | * | 3/1961 | Perkins et al. ............. | 192/3.57 |
| 3,664,470 A | * | 5/1972 | Beech et al. ............... | 192/3.57 |
| 3,776,056 A | * | 12/1973 | Espenschied ................ | 74/364 |
| 3,946,842 A | * | 3/1976 | Siebers et al. ............. | 192/3.58 |
| 4,163,413 A | * | 8/1979 | Kennicutt .................... | 91/521 |
| 4,593,580 A | | 6/1986 | Schulze | |
| 5,481,877 A | | 1/1996 | Bakke et al. ................ | 60/571 |
| 6,223,533 B1 | * | 5/2001 | Schlaupitz .................. | 60/555 |

FOREIGN PATENT DOCUMENTS

| | | | | |
|---|---|---|---|---|
| DE | 3128266 A1 | * | 2/1983 | .......... B60K/20/14 |
| DE | 39 14792 A1 | | 11/1990 | |
| DE | 4408209 A1 | * | 9/1994 | .......... F16H/61/28 |
| WO | WO 99/00616 | | 1/1999 | |

* cited by examiner

*Primary Examiner*—Tisha D Lewis
(74) *Attorney, Agent, or Firm*—Finnegan, Henderson, Farabow, Garrett & Dunner, L.L.P.

(57) ABSTRACT

A gear shift device for a vehicle with a manually operated gearbox (30) and a gear shift device (10) for operating the gearbox. The gear shift device comprises a gear lever (15), a master cylinder (11) and a slave cylinder (12), which are connected to the gearbox (30). A hydraulic line (13) connects the cylinders (11, 12) with each other. The gear shift device also comprises a computer (40) which can receive information concerning an initiated gear shift operation, establish the value of a torque which is exerted on a drive shaft (21) between the vehicle's engine (20) and the gearbox (30), and control the engine's (20) power. In the hydraulic line (13) there is mounted a shut-off valve (42) and the computer (40) is arranged to transmit impulses for controlling the shut-off valve (42) based on the received information.

9 Claims, 1 Drawing Sheet

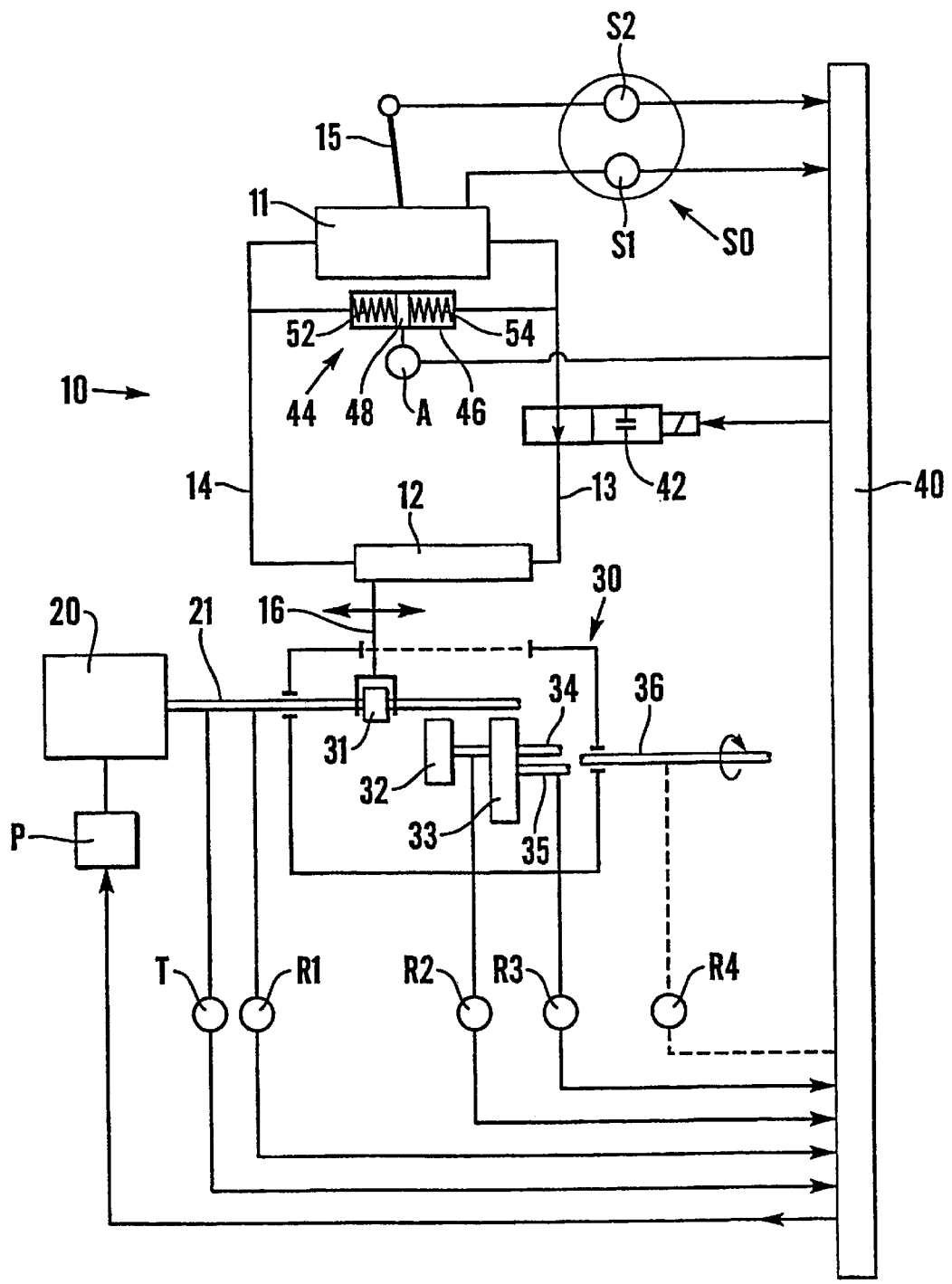

GEAR SHIFT DEVICE

BACKGROUND OF THE INVENTION

The invention relates to a gear shift device for a vehicle.

A gear shift device of this type is known from U.S. Pat. No. 4,593,580. If the driving gear wheel is engaged with a first driven gear wheel and the driving gear wheel requires to be disengaged from this driven gear wheel and the driving gear wheel requires to be engaged with a second driven gear wheel, the torque in the drive shaft is first reduced to zero, whereupon the driving gear wheel is brought out of engagement with the first driven gear wheel. The drive shaft's frequency of rotation is then matched to the frequency of rotation of a second driven gear wheel by means of a regulating device in such a manner that their circumferential speeds are equal, whereupon the driving gear wheel is brought into engagement with it.

Since the frequency of rotation of the driving gear wheel or the second driven gear wheel, or both of these gear wheels vary during the gear change in order to achieve such a match, either due to the fact that the engine's power or the vehicle's speed and thereby the frequency of rotation of the driven gear wheels are altered relatively quickly, the interval in which a gear shift is possible may be very small. Since the vehicle's driver constantly exerts a force on the gear lever in order to achieve the gear shift, i.e. attempts are made to bring the gear wheels into engagement, a continuous sliding or scraping of the gear wheels' teeth against one another can easily occur before the frequencies of rotation of the gear wheels have become matched to such an extent that a gear change can take place. Furthermore, a fracture of teeth may occur if the gear wheels are engaged before their frequencies of rotation have been completely matched.

In manually operated gearboxes the displacement speed for the gear wheel which is moved by the slave cylinder during the engagement is a function of the force which is exerted on the gear lever. Thus the gear shift operation may not be executed during the above-mentioned interval and the gear wheels may slip or scrape against one another.

For example, if this force is great the gear shift may be performed too quickly. If, on the other hand, the force is small, the result may be that the gear shift operation is not started or completed within the above-mentioned interval.

A hydraulic gear shift device with double-acting hydraulic cylinders is known from the applicant's Norwegian patent NO 171426.

An object of the invention is to provide a gear shift device of the type mentioned in the introduction, which to a far less extent is encumbered by the above-mentioned disadvantages.

SUMMARY OF THE INVENTION

In accordance with the foregoing object, this invention provides a gear shift device for a vehicle having a manually operated gearbox, an ingoing drive shaft in the gearbox which is connected with an engine of the vehicle, an outgoing driven shaft from the gearbox, a hydraulic gear shift device which is connected to a selector device, the gearbox having at least one driving gear wheel which is connected to the drive shaft and at least a first and a second, driven gear wheel which are connected to the outgoing driven shaft and by means of the gear selector device may optionally be connected to the drive shaft, a computer which is connected to (i) a gear shift operation-sensor device which is arranged to establish the occurrence of a gear shift operation initiated by means of the selector device and a gear into which a shift is to be made, (ii) a power control device for controlling the engine's power, (iii) a torque establishing device for establishing the value of a torque which is exerted on the drive shaft, and (iv) frequency of rotation sensors for establishing the value of the frequency of rotation of the drive shaft and the driven gear wheels or the driven shaft respectively, the computer being arranged to receive impulses from the gear shift operation-sensor device, the torque establishing device and the frequency of rotation sensors and to transmit control impulses to the power control device, wherein said hydraulic gear shift device includes a master cylinder which is connected to said selector of the hydraulic gear shift device, a slave cylinder which is connected to a selector device of the gearbox, and at least one hydraulic line that connects the master and slave cylinders with each other, and wherein the hydraulic gear shift device comprises a shut-off valve which is mounted in the hydraulic line, and the computer is arranged to transmit impulses for controlling the shut-off valve based on the received impulses.

BRIEF DESCRIPTION OF THE DRAWING

The drawing is a schematic diagram of a gear shift device according to the invention that illustrates the interconnection of the components of the device.

DETAILED DESCRIPTION OF THE INVENTION

As illustrated in the figure, the device according to the invention comprises a hydraulic gear shift device 10 with a double-acting hydraulic master cylinder 11, a double-acting hydraulic slave cylinder 12 and two hydraulic lines 13, 14 connecting these cylinders with each other.

It will be understood, however, that the cylinders may be single-acting and comprise return springs, in which case only one line extends between the cylinders.

The master cylinder may be operated by means of a selector device, e.g. a gear lever 15, and the slave cylinder 12 may have an operating arm 16 connected with its piston, which arm can be moved, for example, backwards and forwards as indicated by a double arrow.

The vehicle which is provided with the gear shift device comprises an engine 20 with a drive shaft 21. An end portion of the drive shaft extends into a gearbox 30 and a driving gear wheel 31 is non-rotationally connected to this end portion. However, the driving gear wheel may, for example, be moved along the drive shaft by means of the operating arm 16.

In the gearbox a number of driven gear wheels with different diameters are installed, only a first and a second driven gear wheel 32 and 33 respectively being illustrated in the figure. The driven gear wheels 32, 33 are arranged to rotate together with respective first and second driven gear wheel shafts 34, 35 which are rotatably mounted in the gearbox 30 and connected with an output shaft 36 which extends out of the gearbox. This output shaft 36 is connected in turn with driving wheels of the vehicle (not illustrated).

When the driving gear wheel 31 is moved along the drive shaft 21 by means of the slave cylinder's operating arm 16, the driving gear wheel 31 and thereby the engine's drive shaft 21 can be connected with either of the driven gear wheels 32, 33. By engaging the various driven gear wheels in this way, the object can be achieved that different torques are exerted in the outgoing shaft 36 and different frequencies of rotation obtained for it during constant engine power and frequency of rotation of the drive shaft 21.

The gear shift device according to the invention comprises a computer 40.

The computer is connected to:
a gear shift operation-sensor device S0 comprising a device S1 for indicating the initiation of a gear shift operation for example a pressure sensor which detects the pressure of the hydraulic fluid in the cylinder chambers (not illustrated) of the double-acting master cylinder 11, and which is arranged to establish the occurrence of a gear shift operation initiated by means of the selector device, i.e. the gear lever 15. The gear shift operation-sensor device S0 may further comprise a selector device or sensor S2 for transmitting an impulse indicating to which gear the shift has to be made.

The computer 40 is furthermore connected to:
a power control device P for controlling the power of the engine,
a torque establishing device T for establishing the value of a torque which is exerted on the input shaft, and
frequency of rotation sensors R1, R2, R3 for establishing the value of the frequency of rotation of the drive shaft 21 and the shafts 34, 35 for the driven gear wheels 32, 33 respectively.

The torque establishment device T, may for example comprise sensors, such as strain gauges which are arranged to transmit to the computer impulses corresponding to the torque in the drive shaft. Alternatively, this device may comprise sensors (not illustrated) which detect values for, e.g., the engine's temperature and fuel consumption per time unit together with the vehicle's speed and transmit corresponding impulses to the computer. By means of these impulses the computer calculates a value for the torque which is exerted on the drive shaft 21.

Instead of the frequency of rotation sensors R2 and R3, a frequency of rotation sensor R4 may be provided for establishing the frequency of rotation of the driven shaft 36, the shafts 34, 35 for the driven gear wheels 32. 33 being constantly connected to the output shaft 36 and rotating with a fixed gear ratio relative thereto. The frequency of rotation sensor R4 therefore detects a frequency of rotation which is proportional to the frequency of rotation of the driven gear wheels. Such a gear ratio can be entered in the computer.

The computer is arranged to
receive impulses from the gear shift operation-sensor device S0, the torque establishing device T and the frequency of rotation sensors R1, R2, R3 and possibly R4,
and to transmit control impulses to the power control device P in a manner which will be explained in more detail below.

In one of the hydraulic lines, for example the line 13, a two-position shut-off valve 42 is inserted which may optionally be brought into a first, open position, wherein hydraulic fluid can flow in the hydraulic line 13, or a second position wherein this fluid is prevented from flowing in this line. This shut-off valve may be electrically operated and is similarly controlled by the computer.

Furthermore, the hydraulic lines 13, 14 are connected to a double-acting hydraulic accumulator 44. The side of the hydraulic accumulator 44 which is connected to the line 13 is connected to the portion thereof which is located between the shut-off valve 42 and the master cylinder 11. The hydraulic accumulator may comprise a cylinder part 46 wherein there is mounted a freely movable piston 48 which defines two cylinder spaces, in each of which is mounted a compression spring 52, 54. These springs 52, 54 attempt to centre the piston 48 in the cylinder part. A position sensor A is arranged to establish the position of the piston in the cylinder part 46 and to transmit an impulse concerning this position, which indicates a ratio of charge for the accumulator, to the computer 40.

The mode of operation for the gear shift device according to the invention is as follows.

In the initial stage it should be assumed that a driven gear wheel, e.g. the gear wheel 32 which is connected to the frequency of rotation sensor R2, is engaged with the driving gear wheel 31, and that the shut-off valve 42 is open.

If a gear shift is required, e.g. if the driven gear wheel 33 which is connected to the frequency of rotation sensor R3 has to be engaged with the driving (year wheel 31, an attempt will first be made to move the gear lever to the neutral position.

By means of this movement of the gear lever, the pressure of the hydraulic fluid in one cylinder chamber of the master cylinder 11 is increased. The pressure sensor S1 immediately establishes this pressure increase and transmits a corresponding impulse to the computer 40.

If in the course of this gear shift operation the driver has not reduced the power, thus causing the torque in the drive shaft to be reduced to almost zero, the computer 40 can effect a closure of the shut-off valve 42 and transmit an impulse to the power device P, with the result that it implements such a reduction of the engine's power. The force which the driver of the vehicle constantly exerts on the gear lever, however, also causes the hydraulic accumulator 44 to be charged, whereby advantageously the gear lever 15 may be be moved, thus giving the driver a satisfying feeling that the gear is being operated.

If the shut-off valve is closed and the torque in the drive shaft 21 has been reduced almost to zero, the computer 40 causes an opening of the shut-off valve 42, whereupon the accumulator 44 quickly supplies fluid to the slave cylinder 12. Since the amount delivered may be great, the slave cylinder's piston and thereby the driving gear wheel are moved rapidly, with the result that the driving gear wheel is rapidly moved to a neutral position, wherein the driving gear wheel is not engaged with any driven gear wheel. For example a position sensor (not illustrated) can detect such a neutral position and transmit a corresponding impulse to the computer.

The gear selector sensor S2 then detects the desired gear as the gear lever is moved on past the neutral position, this sensor being mounted, for example, in the gearbox.

The shut-off valve 42 is then closed once again, whereupon the computer 40 compares the frequencies of rotation for the driving gear wheel 31 and the gear wheel 33 with which the driving gear wheel 31 is to be connected.

If these frequencies of rotation are matched in such a way that the circumferential speeds of these gear wheels agree or are within an acceptable differential speed range, the shut-off valve is opened, whereupon the gear lever can be moved to its final position for engaging these gear wheels.

If the frequency of rotation of the driving gear wheel 31 is too low, the shut-off valve 42 remains closed and the computer 40 transmits an impulse to the power device P, thus enabling the engine's and thereby the driving gear wheel's frequency of rotation to increase.

If the frequency of rotation of the driving gear wheel 31 is too high, the power device P is controlled in such a manner that the engine's frequency of rotation is reduced.

When the circumferential speeds of the driving gear wheel 31 and of the desired, driven gear wheel 33 have thereby approached each other sufficiently to allow the driving gear wheel 31 to be brought into engagement with the desired, driven gear wheel 33, on the understanding that the frequency of rotation of both gear wheels may hereby be altered, the shut-off valve 42 is opened, thus enabling the hydraulic accumulator 44 to deliver a large amount of hydraulic fluid rapidly to the line 14 in order to ensure that the gear wheels 31, 33 are engaged in the course of the shortest possible time, i.e., while the frequencies of rotation of the gear wheels are such that their circumferential speeds are within a fixed differential range, thus permitting an engagement of the gear wheels 31, 33 to take place without an unacceptable slipping or scraping of their teeth against one another.

After completion of the gear change, the power device P is given information from the computer concerning an increase in the power to a value corresponding to a selected accelerator pedal position or power value.

The shut-off valve 42 thereby assures a gear shift, by ensuring that the gear wheels of the gearbox which have to be brought into engagement, have obtained frequencies of rotation which match each other, thus preventing a slipping of the gear wheels' teeth or a fracture thereof.

The hydraulic accumulator ensures that the gear lever can be moved in a substantially smooth fashion during gearing, thus giving the driver of the vehicle a feeling that the gearing is being performed almost continuously even though the fluid flow in the lines 13, 14 is temporarily stopped, and that a large amount of fluid is delivered to the slave cylinder for rapid operation thereof when the gear wheels of the gearbox which are to be brought into engagement during, gearing have frequencies of rotation which are within the limits which ensure that gearing takes place noiselessly and without causing damage.

In the above a simplified embodiment of a gearbox has been described. It will be appreciated that the gearbox may be designed in other ways. For example, it may comprise several driven gear wheels for each gear. Moreover, the drive shaft may be in the form of a toothed shaft, forming the driving gear wheel with which driven gear wheels can be brought into engagement.

In addition to the above-mentioned advantages of the arrangement of the shut-off valve, it can also prevent an inadvertent shift to a reverse gear while the vehicle is moving forwards. Moreover, it can prevent an inadvertent shift to a gear which is not an adjacent gear to the gear which is engaged for example a gear which is too low, whereby the engine may be damaged.

Even though the gear shift device according to the invention has been described above in connection with a gearbox without a synchronising device, it will be understood that the gear shift device may also be employed for gearboxes with a synchronising device, if this should be desirable, e.g. for certain technical reasons during production or in order to obtain a synchronised gearbox whereby the vehicle's driver does not need to exert great force while changing gear.

Even though it has been stated above that the gear shift device is hydraulic, it will be understood that it may be, e.g., electrical instead. In this case the hydraulic master cylinder and slave cylinder are replaced by an electrical transmitter device or a slave device. The hydraulic shut-off valve 42 is replaced by an electrical device which prevents operation of the slave device in the same way as in the hydraulic gear shift device.

What is claimed is:

1. A gear shift device for a vehicle comprising a manually operated gearbox, an ingoing drive shaft in the gearbox which is connected with an engine of the vehicle, an outgoing driven shaft from the gearbox, a hydraulic gear shift device which is connected to a first selector, the gearbox having at least one driving gear wheel which is connected to the drive shaft and at least a first and a second, driven gear wheel which are connected to the outgoing driven shaft and by means of the first selector may optionally be connected to the drive shaft, a computer which is connected to (i) a gear shift operation-sensor device which is arranged to establish the occurrence of a gear shift operation initiated by means of the first selector and a gear into which a shift is to be made, (ii) a power control device for controlling the engine's power, (iii) a torque establishing device for establishing the value of a torque which is exerted on the drive shaft, and (iv) frequency of rotation sensors for establishing the value of the frequency of rotation of the drive shaft and the driven gear wheels or the driven shaft respectively, the computer being arranged to receive impulses from the gear shift operation-sensor device, the torque establishing device and the frequency of rotation sensors and to transmit control impulses to the power control device, wherein said hydraulic gear shift device includes a master cylinder which is connected to said first selector of the hydraulic gear shift device, a slave cylinder which is connected to a second selector of the gearbox, and at least one hydraulic line that connects the master and slave cylinders with each other, and wherein the hydraulic gear shift device comprises a shut-off valve which is mounted in the hydraulic line, and the computer is arranged to transmit impulses for controlling the shut-off valve based on the received impulses.

2. The gear shift device of claim 1, wherein a hydraulic accumulator is connected to the hydraulic line.

3. The gear shift device of claim 1, wherein the master cylinder and the slave cylinder are double-acting and between them there extend two hydraulic lines, the shut-off valve being mounted in one of these lines.

4. The gear shift device of claim 2, wherein the master cylinder and the slave cylinder are double-acting and between them there extend two hydraulic lines and the hydraulic accumulator is double-acting and connected to both the lines.

5. The gear shift device of claim 2, wherein the hydraulic accumulator is connected to a charge condition sensor for establishing the hydraulic accumulator's charge condition, and which is connected to the computer.

6. The gear shift device of claim 1, wherein the gear shift operation-sensor device comprises a pressure sensor for establishing a pressure of hydraulic fluid in the hydraulic line.

7. The gear shift device of claim 3, wherein the gear shift operation-sensor device comprises two pressure sensors for establishing a pressure of hydraulic fluid in the respective hydraulic lines.

8. The gear shift device of claim 1, wherein the manually operated gearbox does not have a mechanical synchronisation device.

9. The gear shift device of claim 1, wherein the first selector of the hydraulic gear shift device is a gear lever.

* * * * *